United States Patent
Sakai et al.

(10) Patent No.: US 7,264,164 B2
(45) Date of Patent: Sep. 4, 2007

(54) TAPE PRINTING SYSTEM, TAPE PRINTING METHOD, AND TAPE PRINTING PROGRAM

(75) Inventors: Mamoru Sakai, Suwa (JP); Mikihiro Kajihara, Suwa (JP); Yoichi Hine, Tokyo (JP); Takanobu Kameda, Tokyo (JP); Toshinori Nojima, Tokyo (JP)

(73) Assignees: King Jim Co., Ltd. (JP); Seiko Epson Corporation (JP)

( * ) Notice: Subject to any disclaimer, the term of this patent is extended or adjusted under 35 U.S.C. 154(b) by 329 days.

(21) Appl. No.: 10/917,539

(22) Filed: Aug. 13, 2004

(65) Prior Publication Data

US 2005/0077361 A1  Apr. 14, 2005

(30) Foreign Application Priority Data

Aug. 28, 2003 (JP) .............................. 2003-305029
Aug. 29, 2003 (JP) .............................. 2003-306082

(51) Int. Cl.
 *G06K 7/10* (2006.01)
(52) U.S. Cl. .................. 235/462.01; 235/454
(58) Field of Classification Search ................ 235/454, 235/462.01, 462.25
See application file for complete search history.

(56) References Cited

U.S. PATENT DOCUMENTS 5,857,789 A * 1/1999 Day et al. ................. 400/615.2
5,988,897 A * 11/1999 Pierce et al. ................... 400/61
6,633,292 B2 * 10/2003 Nakatsuji et al. ............ 345/471
2001/0043214 A1* 11/2001 Nakatsuji et al. ............ 345/471
2004/0111277 A1* 6/2004 Pearson et al. ................. 705/1

FOREIGN PATENT DOCUMENTS

| JP | 05-342385 | 12/1993 |
|----|-----------|---------|
| JP | 05-342386 | 12/1993 |
| JP | 06-089355 | 3/1994 |
| JP | 07-081149 | 3/1995 |
| JP | 07-085201 | 3/1995 |
| JP | 07-093448 | 4/1995 |

* cited by examiner

*Primary Examiner*—Thien M. Le
*Assistant Examiner*—April A. Taylor
(74) *Attorney, Agent, or Firm*—Bacon & Thomas, PLLC

(57) ABSTRACT

User can flexibly increase in setting a bar code margin and easily confirm a bar code image relative position. Operability is improved in inputting a character string regarding the bar code. For the margin, a bar code guide giving a target size of a bar code image area is displayed in an input print preview. When the character string regarding the bar code has been already input and a bar code type is changed, the character string already input is checked against character input conditions defined by the post-change type of bar code. In inputting the characters regarding the bar code, the input characters are checked against the character input conditions, such as the character type and the defined number of characters defined by the set bar code type. Therefore, the input character is ignored or displayed in a mode in which the input character is different from other characters.

18 Claims, 12 Drawing Sheets

(A)    (B)

TAPE PRINTING SYSTEM, TAPE PRINTING METHOD, AND TAPE PRINTING PROGRAM

CROSS-REFERENCE TO RELATED APPLICATION

This application claims, under 35 USC 119, priority of Japanese Application No. 2003-305029 filed Aug. 28, 2003 and Japanese Application No. 2003-306082 filed Aug. 29, 2003.

BACKGROUND OF THE INVENTION

1. Field of the Invention

The present invention relates to a tape printing system, a tape printing method, and a tape printing program, particularly to improvement of a function of inputting a bar code (the word of "bar code" includes not only a normal bar code but also a two-dimensional code).

2. Description of the Related Art

Generally a tape printing apparatus has a function of printing the bar code. The bar code is the code which provides a narrow line, a wide line, an interval between the lines, and the like. The bar code corresponds to an input character string (character code string), and each character code (hereinafter appropriately referred to as "character") is converted into the bar code. The bar code includes various types (standards). A type of character, the number of characters, and the like which can be converted into the bar code are provided by each type of bar code. For example, in "JAN-13," only the character string having 12-figure numbers is permitted.

Therefore, there has been already proposed an apparatus (Japanese Patent Application Laid-Open (JP-A) No. 6-89355). In the apparatus, when the whole of character string converted into the bar code is input to operate a key for providing an instruction to finish an input, it is decided whether the character string satisfies character input conditions, such as the type of character and the number of characters, which are provided by the type of bar code. Then, the apparatus displays an unsatisfied state when the input characters do not satisfy the character input conditions.

A normal procedure of inputting the bar code includes the steps of setting the type of bar code, inputting the character string, and converting the character string into the bar code (bar code image) on the basis of the key operation of providing the instruction to finish the input in order.

There has been also proposed an apparatus which automatically gives a predetermined amount of margin in front of and at the back of the bar code during dot expansion in order to correctly read the bar code printed in the tape (JP-A No. 5-342385). The predetermined amount of margin means a (length of) quiet zone provided by the bar code standard in order to read the bar code correctly.

However, in the conventional apparatus described in JP-A No. 6-89355, until the key operation of providing the instruction to finish the input, the user can not recognize whether the input character satisfies the character input conditions determined by the type of bar code. Therefore, there is a problem that most parts of the operation of inputting the character string are wasted when the input does not satisfy the character input conditions.

The case in which the input does not satisfy the character input conditions includes the case in which the character string is input while setting the type of bar code is mistaken and the case in which inputting the character itself is mistaken while setting the type of bar code is correct. The former case corresponds to the display in which the input does not satisfy the character input conditions while the input character string is correct. When the setting of the type of bar code is changed, all the input character strings are deleted, and it is necessary for the user to input all the character string from the beginning, again.

Since the display in which the input does not satisfy the character input conditions or the display of only the character input conditions is performed, the user can not immediately recognize which character does not satisfy the character input conditions.

Since the character input conditions vary depending on the type of bar code, it is necessary to specify the type of bar code in advance of the input of the character string. Therefore, there is the problem that an operating procedure is restricted.

The conventional apparatus described in JP-A No. 5-342385 is one in which the operation of forming the predetermined amount of margin is performed during the dot expansion after the print instruction is provided. When the bar code is input, the user can not recognize how the margin is formed.

Among the apparatuses which are currently placed on the market, there is the apparatus in which the input bar code is displayed by a print preview screen to cause the user to recognize the margins (quiet zone) in front of and at the back of the bar code.

However, when the character string is input in front of and at the back of the bar code except for the character string which is printed on the lower side of the bar code and indicates contents of the bar code, in consideration of the margins in front of and at the back of the bar code, sometimes the user inputs the character string while the character string is unnecessarily separated away from the bar code. In this case, a print label unnecessarily becomes longer.

For example, in the case of the tape printing apparatus, an increase in length of each print label wastes the expensive tape. The user who uses the bar code printing function of the tape printing apparatus generally produces the bar code label for the purpose of adhesion to a commodity, resulting in increasing the number of bar code labels produced by the tape printing apparatus. Therefore, an increase in length of each print label causes a large problem.

Depending on performance of a bar code reader which is owned by the user, the bar code can be correctly read even if the margin is shorter than the quiet zone. Particularly, when a pen type bar code reader which reads the bar code by tracing the bar code is applied, the quiet zone does not becomes troublesome in many cases. Despite the bar code label is produced on the basis of the assumption that the bar code label is read by the pen type bar coder reader, the production of the bar code label having a large margin such as the quiet zone means that the bar code label including a wasted space is produced.

SUMMARY OF THE INVENTION

It is an object of the invention to provide the tape printing system, the tape printing method, and the tape printing program in which a degree of user's flexibility is increased in setting the margin of the bar code and the user can easily confirm input contents of the bar code.

In the invention, in consideration of the margin, a bar code guide which gives a target of a size of the bar code image area is displayed in an input print preview. The user can set whether the bar code guide is displayed or not. The user can arbitrarily set the size of the displayed bar code guide.

It is another object of the invention to provide the tape printing system, the tape printing method, and the tape printing program in which operability is further improved in inputting the character string with respect to the bar code.

In the invention, when the type of bar code is changed and the character string with respect to the bar code is already input, the character string which is already input is collated with character input conditions determined by the post-change type of bar code. In inputting the character with respect to the bar code, the input character is collated with the character input conditions, such as the type of character and the specified number of characters, which are determined by the set type of bar code. When the mismatch exists in the collation, the mismatch input character is neglected or the mismatch input character is displayed in a mode different from that of other correct characters.

DETAILED DESCRIPTION OF THE PREFERRED EMBODIMENTS

(A) First Embodiment

A first embodiment of the tape printing system, the tape printing method, and the tape printing program according to the invention will be described below.

Figure 1:
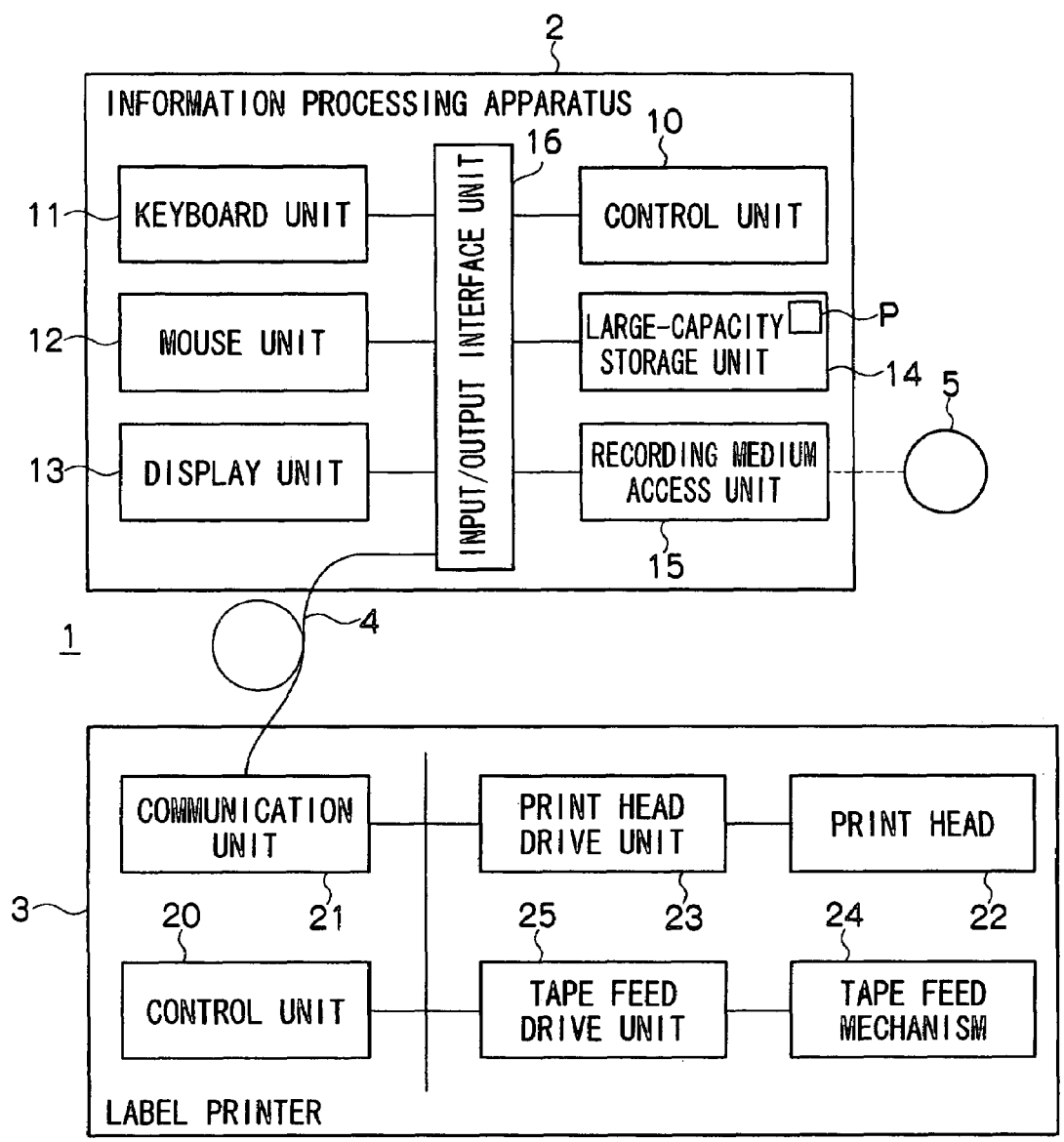
FIG. 1 is a block diagram showing a configuration of a tape printing system of a first embodiment.

FIG. 1 is a block diagram showing an overall configuration of the tape printing system of the first embodiment.

A tape printing system 1 of the first embodiment includes an information processing apparatus 2 to which a stand-alone type personal computer or notebook personal computer or the like is appropriate and a label printer 3 serving as a peripheral device of the information processing apparatus 2. The label printer 3 is connected to the information processing apparatus 2 by a cable, or the label printer 3 is wirelessly connected to the information processing apparatus 2.

The information processing apparatus 2 includes a control unit 10, a keyboard unit 11, a mouse unit 12, a display unit 13, a large-capacity storage unit 14, a recording medium access unit 15, and an input/output interface unit 16. The keyboard unit 11, the mouse unit 12, the display unit 13, the large-capacity storage unit 14, and the recording medium access unit 15 are connected to the control unit 10 through the input/output interface unit 16. The label printer 3 is also connected to the control unit 10 through the input/output interface unit 16 in which a cable 4 is stored. The information processing apparatus 2 also has acoustically informing means such as a buzzer; however, it is not shown in FIG. 1.

The label printer 3 includes a control unit 20, a communication unit 21, a print head 22, a print head drive unit 23, a tape feed mechanism 24, and a tape feed drive unit 25.

The control unit 10 in the information processing apparatus 2 includes CPU, ROM, RAM, and CG-ROM. In accordance with the program stored in ROM and RAM, CPU executes the processing while using RAM as a working memory or main memory. In display output processing or print output processing, the data stored in CG-ROM is properly utilized and a display buffer or a print buffer is properly set in RAM to perform the processing.

The keyboard unit 11 is integrally provided in a chassis of the information processing apparatus 2, or the keyboard unit 11 is provided separately from the apparatus 2. The keyboard unit 11 is used for the inputs of characters, control information, and the like. The mouse unit 12 is connected to the chassis of the apparatus 2 and used for a cursor movement instruction, an icon selection instruction, and the like. Instead of the mouse unit 12, it is also possible to apply another pointing device. Another pointing device may also be integrally provided in the chassis of the apparatus 2.

The display unit 13, to which a CRT display and a liquid crystal display are appropriate, displays the image under control of the control unit 10.

The large-capacity storage unit 14 such as a hard disk drive stores various programs, data, and applications installed in the information processing apparatus 2. Depending on a load of the process, the large-capacity storage unit 14 also functions as a working memory supplementing RAM in the control unit 10.

In the first embodiment, a tape printing program P is stored in the large-capacity storage unit 14.

For example, an external or built-in device accessing the recording medium such as CD-ROM and a flexible disk is appropriate to the recording medium access unit 15. The recording medium for inputting and outputting file data and the recording medium for stores the application program to cause the apparatus to install the application program in the apparatus are loaded in the recording medium access unit 15. The recording medium includes a recording medium 5 in which the tape printing program P is stored. It is possible that the plurality of recording medium access units 15 are provided in each type of recording medium.

A copy (installation) of the tape printing program P to the large-capacity storage unit 14 can be not only read and stored from the recording medium 5 but also downloaded from another device.

The input/output interface unit 16 acts as an interface function between the control unit 10 and other processing devices. Each processing devices has each interface unit; however, it is not clearly shown in FIG. 1. The input/output interface unit 16 shown in FIG. 1 has also a communication unit such as a driver and a receiver or the like which communicates with the label printer 3.

The control unit 20 of the label printer 3 includes CPU, ROM, and RAM. The control unit 20 performs control of the printing of the loaded tape while buffering the print image data transferred from the information processing apparatus 2.

The communication unit 21 includes a communication driver and receiver. The communication unit 21 communicates with the information processing apparatus 2 under control of the control unit 20.

For example, the print head 22 includes a thermal head. The print head 22 transfers the ink of an ink ribbon to the tape. The print head drive unit 23 properly drives each heater element of the print head 22 under the control unit 20.

The tape feed mechanism 24 is one which runs or stops the tape and the ink ribbon in a tape cassette (not shown) loaded in the label printer 3. The tape runs from inside the tape cassette to the outside. The ink ribbon runs inside the tape cassette, and a window is formed at a position opposite to the print head 22.

The tape feed drive unit 25 drives the tape feed mechanism 24 under control of the control unit 20.

The label printer 3 may be provided with the mechanism for automatically cutting the printed tape and the drive unit for the automatically cutting mechanism.

Figure 2:
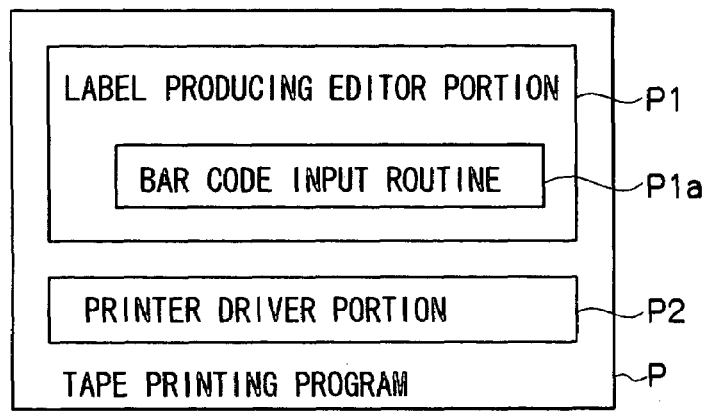
FIG. 2 is an explanatory view showing the configuration of a tape printing program of the first embodiment.

As shown in FIG. 2, the tape printing program P which is stored in the recording medium 5 and copied (installed) in the large-capacity storage unit 14 roughly includes a label producing editor portion P1 and a printer driver portion P2. The label producing editor portion P1 has an edit function of inputting and correcting contents printed in the label or of inputting and outputting the contents as the file. A bar code input routine P1a (described later in FIG. 4) is provided as one of processing routines of the label producing editor portion P1. The printer driver portion P2 is the program which performs driving processing to the label printer 3. The printer driver portion P2 has the function of expanding the print contents data in dots to convert the data into the print image data, and the printer driver portion P2 also has the function of transferring the print image data to the label printer 3 in accordance with specifications of the label printer 3.

The first embodiment has the feature in the bar code input function, i.e. the bar code input routine P1a. The details of the label producing editor portion P1 including the bar code input routine P1a will be apparent from the later-mentioned description of operations.

The operation (tape printing method) of the tape printing system 1 of the first embodiment will be described below. The following description describes the case where the tape printing program P is already installed in the large-capacity storage unit 14 and the label producing editor portion P1 of the tape printing program P is selected as the application program to be executed. In executing the tape printing program P, a part of the tape printing program P is adapted to be transferred to the area in RAM which functions as the main memory in the control unit 10 to perform the high-speed processing.

The label producing editor portion P1 includes fixed data such as setting display image data. The label producing editor portion P1 is adapted to sequentially change the processing by an icon operation on the display screen or a signal from the keyboard unit 11.

The control unit 10 causes the display unit 13 to display an initial image (not shown) including alternative icons of "New Document," "Open File," "Create in Design Form," and "Cancel" immediately after the label producing editor portion P1 is selected. The "Cancel" icon finishes the application.

Figure 3:
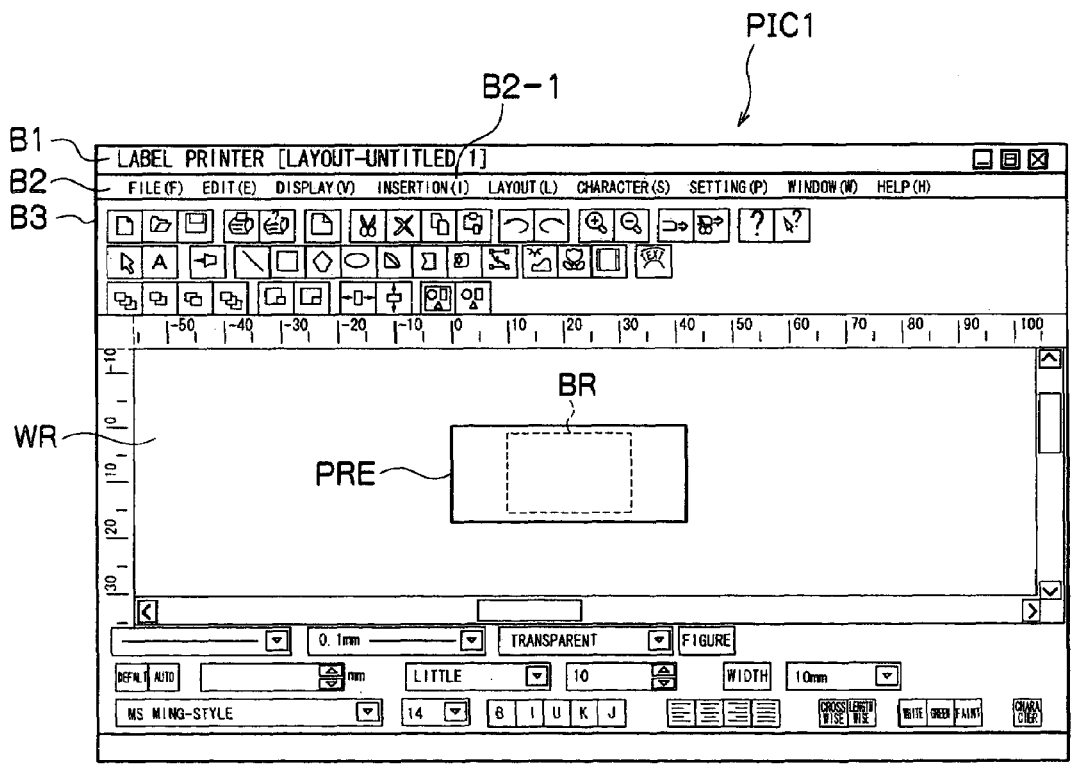
FIG. 3 is an explanatory view showing an input image of print contents of the first embodiment.

The "New Document" icon indicates a processing mode in which the contents printed in the label are input from the beginning. When the "New Document" icon is clicked by the mouse unit 12, the control unit 10 displays an attribute setting image (not shown) on the display unit 13 to prompt a user to set attribute items such as the type of the label printer 3, a tape width, a tape length, the margin length in the label, tape placement (lengthwise or crosswise) on the display screen (input image screen), magnification, and a purpose and the type of the label. When the user clicks an "OK" icon in the attribute setting screen with the mouse unit 12, the control unit 10 causes the display unit 13 to display an input image PIC1 as shown in FIG. 3.

The input image PIC1 includes a working region WR and various kinds of bars such as a title bar B1, a menu bar B2, and a standard tool bar B3 which are arranged at the top and bottom of the working region WR. A print preview PRE of the label is displayed in the working region WR, and the print preview PRE includes a print range BR surrounded by, e.g., a red broken line.

The "Open file" icon in the initial image (not shown) indicates the processing mode in which the contents printed in the label is obtained from the file data stored before. When the "Open file" icon is clicked by the mouse unit 12, the control unit 10 displays a file selection screen (not shown) on the display unit 13 to prompt the user to select the file data. At this point, the control unit 10 displays the input image PIC1 shown in FIG. 3 on the display unit 13.

The print image concerning the selected file data is also displayed within the print range BR in the input image PIC1 displayed by opening the file.

The "Create in Design Form" icon in the initial image (not shown) indicates the processing mode in which the contents printed in the label is obtained by utilizing a previously prepared design form for an address or a videotape. When the "Create in Design Form" icon is clicked by the mouse unit 12, the control unit 10 displays a design form selection screen (not shown) on the display unit 13 to prompt the user to select the design form, and the control unit 10 allows the user to visually confirm the selected design form. When the user finishes the visual confirmation, the user provides an instruction for the confirmation of the selection. At this pint, the control unit 10 displays the input image PIC1 shown in FIG. 3 on the display unit 13. The print image with respect to the selected file data is also displayed within the print range BR in the input image PIC1 displayed by selecting the design form.

In the stage in which the input image PIC1 shown in FIG. 3 is displayed after one of the "New Document," "Open File," and "Create in Design Form" icons is clicked to perform the processing in each mode, the user newly inputs the contents printed in the label (print image) or corrects and input the contents.

Figure 4:
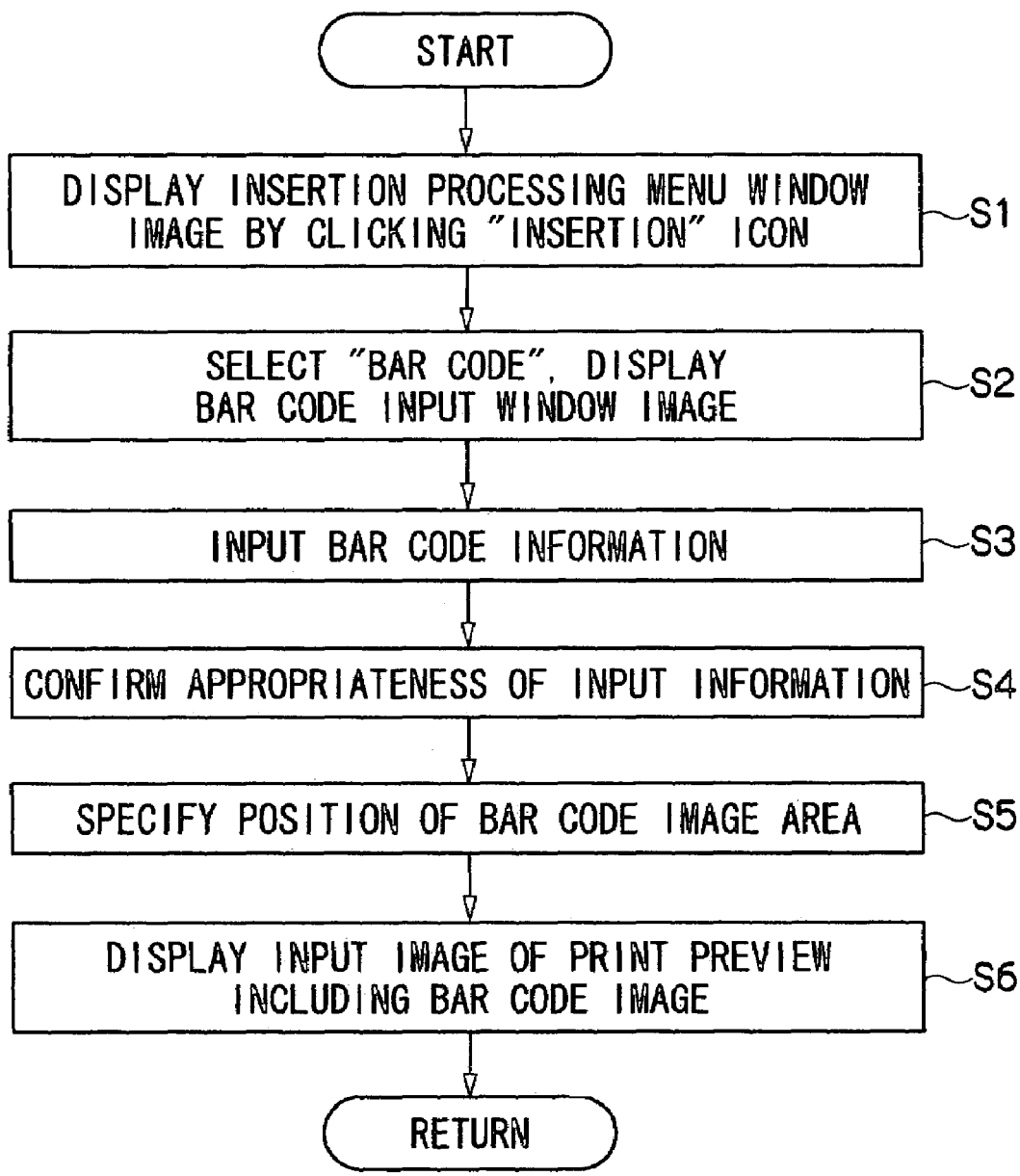
FIG. 4 is a flow chart showing a procedure of inputting bar code information of the first embodiment.

In the first embodiment, the print image can also include the bar code (bar code image). In this case, the user's procedure and the process of the control unit 10 are as follows: FIG. 4 shows a general flow of the user's procedure and the process of the control unit 10 in the case where the bar code is included in the print image.

Figure 5:
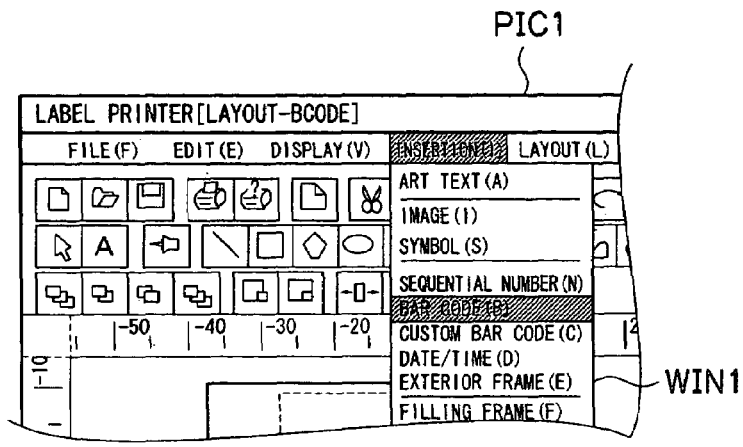
FIG. 5 is an explanatory view of a method of entering the input image of the bar code information of the first embodiment.

When the user clicks the "Insertion" icon B2-1 in the menu bar B2 of the input image PIC1, as shown in FIG. 5, the control unit 10 displays an insertion processing menu window image WIN1 on the display unit 13 while superimposing the insertion processing menu window image WIN1 on the input image PIC1 (S1).

Then, the user selects "Bar Code" out of the insertion processing menu window image WIN1 with the keyboard unit 11 or the mouse unit 12. At this point, as shown in FIG. 6, the control unit 10 displays a bar code input window image WIN2 on the display unit 13 while superimposing the bar code input window image WIN2 on the input image PIC1 (S2).

The bar code input window image WIN2 includes a pop-up menu WIN2a which selects the type of bar code (bar code standard), an input field WIN2b of a code string (for example, alphanumeric code string) which is expressed by the bar code, an bar code height input field WIN2c, a narrow-bar width input field WIN2d, a font input field WIN2e of the character string included in the bar code image, a character size input field WIN2f of the character string included in the bar code image, a checkbox (radio button is also usable) WIN2g which prompts the user to instruct whether a check digit is included or not in the code string expressed by the bar code, a checkbox WIN2h which prompts the user to provide the instruction whether a rectangular bar code guide (see LIN of FIG. 7B) which surrounds the bar code image area and whose lengthwise length is arbitrary is displayed or not, a checkbox WIN2i which prompts the user to instruct whether a notation of the character string is included or not in the bar code image area, an input field WIN2j of the margin length on the right side of the bar code guide, and an input field WIN2k of the margin length on the left side of the bar code guide. The bar code input window image WIN2 also includes an "OK" icon WIN2l, a "Cancel" icon WIN2m, and a "Help" icon WIN2n.

Figure 7:
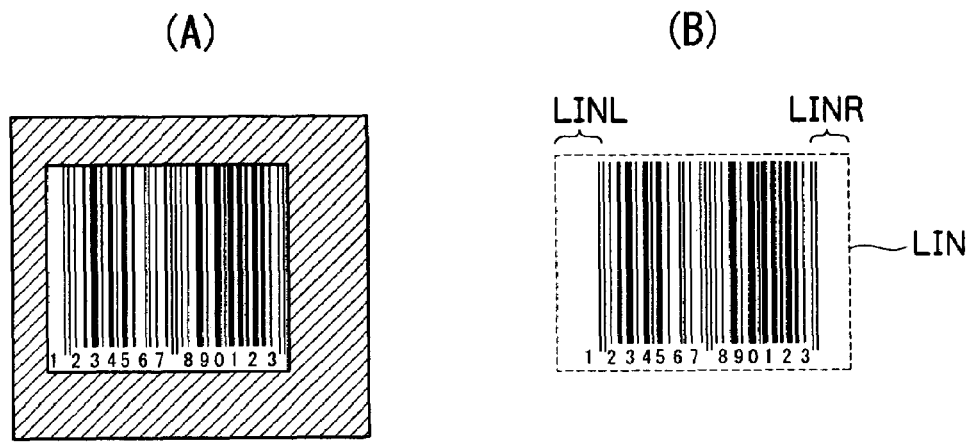
FIG. 7 is an explanatory view of a bar code guide in the first embodiment.

FIG. 7 is an explanatory view of the function of the bar code guide. In the first embodiment, as shown in FIG. 7A, the bar code image area is processed while always having no margin in front of and at the back of the bar code image area. In the case where the margins are not provided in front of and at the back of the bar code image area, the user can specify the position of the bar code image area independently of the quiet zone. On the contrary, a positional relationship between the bar code image area and the character string area except for the bar code character string may be improper when scanning by the bar code reader. Therefore, when the bar code input is finished to display the print preview PRE of the label in the input image PIC1 again, as shown in FIG. 7B, a bar code guide LIN is displayed such that the bar code image area is properly surrounded in accordance with the selection of the user, as if the bar code guide LIN defines the margins in front of and at the back of the bar code image.

Figure 6:
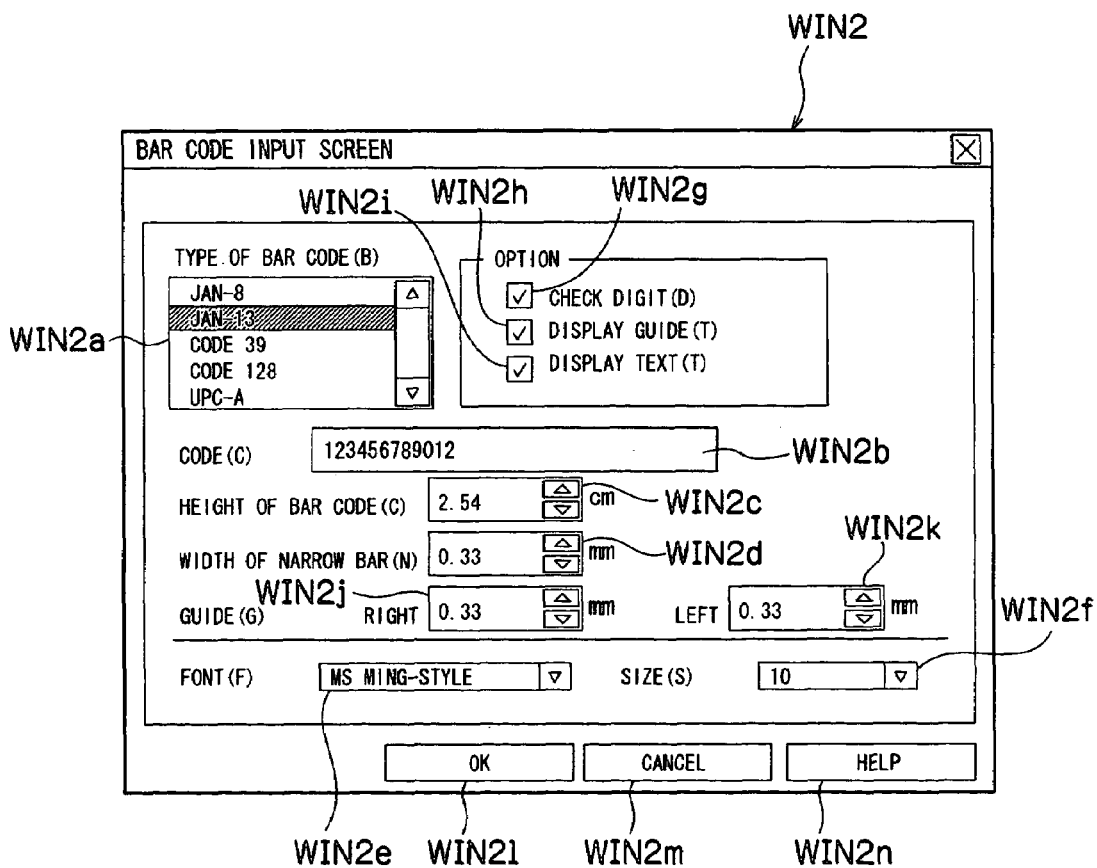
FIG. 6 is an explanatory view showing the input image of the bar code information of the first embodiment.

When the bar code input window image WIN2 shown in FIG. 6 is displayed, the default contents are displayed. In the default contents, the code string input field WIN2b is a blank. It is also possible to display the last contents in inputting the bar code.

The user performs the operation of inputting the bar code information to the bar code input window image WIN2, and the control unit 10 buffers the input contents (S3). A detail example of the processing in inputting the bar code information is described in a second embodiment.

In the operation of inputting the bar code information, generally the user clicks the "OK" icon WIN2l after selecting the type of bar code to input the code string (alphanumeric string and the like) expressed by the bar code. Before the user operates the "OK" icon WIN2l, the user can perform the various kinds of the attribute settings. The input mode of the bar code can be cancelled by operating the "Cancel" icon WIN2m. Further, the information concerning guidance on the operation or the like can be obtained by operating the "Help" icon WIN2n.

In selecting the type of bar code, typical values at the type are initially displayed in the bar code height input field WIN2c and the narrow-bar width input field WIN2d. The bar code height and the narrow-bar width can be changed by the numerical input with the keyboard unit 11 or by a gradual increase or a gradual decrease in each predetermined unit with the mouse unit 12.

Depending on the type of bar code, the check digit is always included. When the type of bar code which always includes the check digit is selected, the user can not operate the checkbox WIN2g with respect to the check digit, and the check digit is automatically added by the apparatus. When the type of bar code independent of the addition of the check digit is selected, the user can operate the checkbox WIN2g with respect to the check digit. In this case, the apparatus adds the check digit when the checkbox WIN2g is marked, and the apparatus does not add the check digit when the checkbox WIN2g is not marked.

The checkbox WIN2h, as described above, prompts the user to instruct whether the bar code guide is displayed or not. In the case where the display of the bar code is instructed from the user, the bar code guide is also displayed as shown in FIG. 7B when the display returns to the print preview including the barcode. In the case where the display of the bar code is not instructed from the user, the bar code guide is not displayed when the display returns to the print preview including the bar code.

Namely, in the first embodiment, the user can select whether the bar code included in the display or not in the print preview including the bar code.

Immediately after the bar code input window image WIN2 is displayed, for example, the checkbox WIN2h with respect to the bar code guide display is marked. When the user does not need to display the bar code guide, the user turns off the checkbox WIN2h.

The input field WIN2j of the margin length on the right side of the bar code guide and the input field WIN2k of the margin length on the left side become valid only in the case where the checkbox WIN2h with respect to the bar code guide display is marked. In the input field WIN2j and the input field WIN2k immediately after the input field WIN2j and the input field WIN2k become valid, for example, the length corresponding to the quiet zone of the selected type of bar code is displayed as a default value, and the user can arbitrarily change the default value.

The margin length on the right side of the bar code guide means a width LINR of a part on the right side from the bar code image area in the bar code guide LIN, and the margin length on the left side of the bar code guide means a width LINL of a part on the left side from the bar code image area in the bar code guide LIN (see FIG. 7B).

In the first embodiment, the user can arbitrarily specify the displayed margin widths on the right and left sides of the bar code without being restricted by the quiet zone and also specify the different lengths (one of lengths may be zero).

The checkbox WIN2*i*, as described above, prompts the user to instruct whether the code string (alphanumeric string) expressed by the bar code is included or not in the bar code image area. Examples of FIGS. 7A and 7B show the bar code image including the code string of "1234567890123." When the checkbox WIN2*i* is not marked, the code string of "1234567890123" is not included in the bar code image.

Only in the case where the checkbox WIN2*i* with respect to the notation of the code string (for example, alphanumeric string) is marked, the character-string font input field WIN2*e* and the character-string character size input field WIN2*f* become valid, and the user can arbitrarily specify the font and the character size of the character string.

When the "OK" icon WIN2*l* is clicked in the bar code input window image WIN2, the control unit 10 of the information processing unit 2 first confirms whether the input contents are appropriate or not (S4). It is also possible that the confirmation whether the input contents are appropriate or not is performed at timing defined in the later-mentioned second embodiment.

In the confirmation processing, for example, it is confirmed whether the codes of the type of character permitted in the selected type of bar code are input by the number of codes provided by the selected type of bar code or not.

Figure 8:
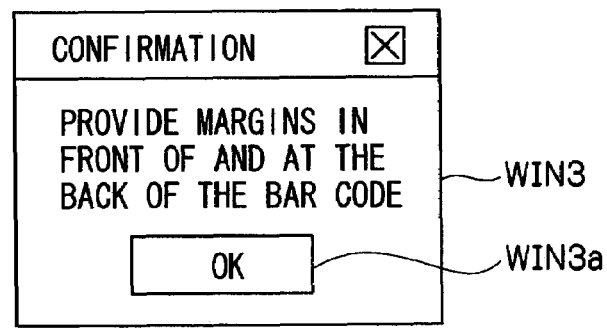
FIG. 8 is an explanatory view of a confirmation image for prompting a user to secure a bar code margin of the first embodiment.

When the input contents with respect to the bar code are appropriate, as shown in FIG. 8, independently of specification of the display of the bar code guide, the control unit 10 causes the display unit 13 to display a window image WIN3 for prompting the user to specify the position so as to provide the front and rear margins in bar code position specification.

Figure 9:
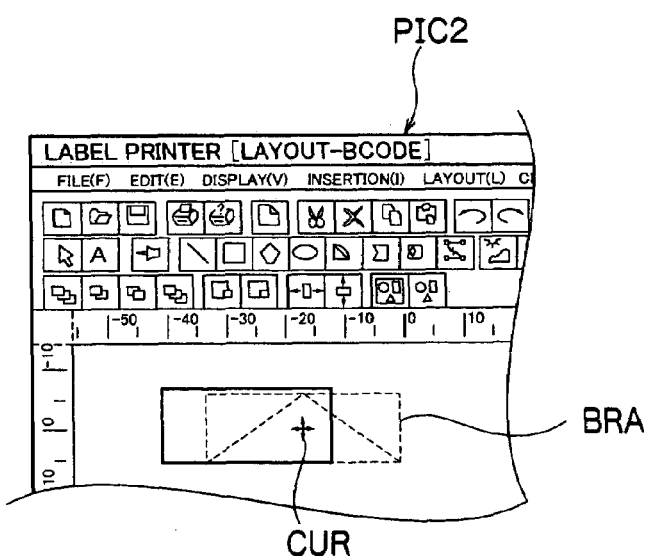
FIG. 9 is an explanatory view of the method of setting a position of a bar code image area of the first embodiment.

When an "OK" icon WIN3*a* is operated in the window image WIN3, or when predetermined display time of the window image WIN3 has elapsed, the control unit 10 determines the size of the bar code image area on the basis of the specified height of the bar code, the specified width of the narrow bar, and the like. Then, in order to specify the position of the bar code image area, as shown in FIG. 9, the control unit 10 causes the display unit 13 to display an input image PIC2 (corresponding to the input image PIC1 of FIG. 3) which includes a graphic form BRA indicating the size of the bar code image area (see FIG. 7A), and the control unit 10 prompts the user to specify the position of the bar code image area (S5). For example, the user specifies the position of the bar code image area by properly moving and clicking a cursor CUR indicating the central position of the bar code image area graphic form BRA with the mouse unit 12 or the like.

Therefore, the control unit 10 displays an input image (not shown) which has the print preview of the label including the bar code image (S6).

At this point, when the checkbox WIN2*h* with respect to the display of the bar code guide is marked, the control unit 10 displays the bar code guide LIN having the right-side margin length specified by the input field WIN2*j* and the left-side margin length specified by the input field WIN2*k* around the bar code image. The bar code guide LIN and the print range BR (see FIG. 3) are distinguishably displayed by applying the color or the type of the line (such as broad line, narrow line, broken line, dotted line, and alternate long and short dash line) which is different from the line (for example, red broken line) defining the print range BR to the bar code guide LIN. As described above, the bar code guide LIN is longer than the bar code image area in the lengthwise direction. The bar code guide LIN is not one which shows the size of the bar code image area but one which gives a target for properly arranging the positional relationship between the bar code image area and the character string area (securing the margin).

The character string except for the character string with respect to the bar code is also managed in area unit. In the case where the bar code image area and the character string overlap each other, for example, only the bar code image is displayed for the overlapping area in the print preview of the label.

The user properly corrects the bar code image area and/or the position of the character string area while seeing the input image which has the print preview of the label including the bar code image. When the cursor is positioned in the bar code image area in the print preview to click the mouse unit 12, a surrounding frame showing clearly a periphery of the bar code image area is displayed (see POS in FIG. 11) and the moving instruction for the surrounding frame (for example, the cursor is moved while a left button of the mouse unit 12 is clicked) is received to perform the processing such as the change in position of the bar code image area. When the cursor is positioned in the character string area in the print preview to click the mouse unit 12, the surrounding frame showing clearly a periphery of the character string area is displayed (see POS in FIG. 11) and the moving instruction for the surrounding frame is received to perform the processing such as the change in position of the character string area.

Figure 10:
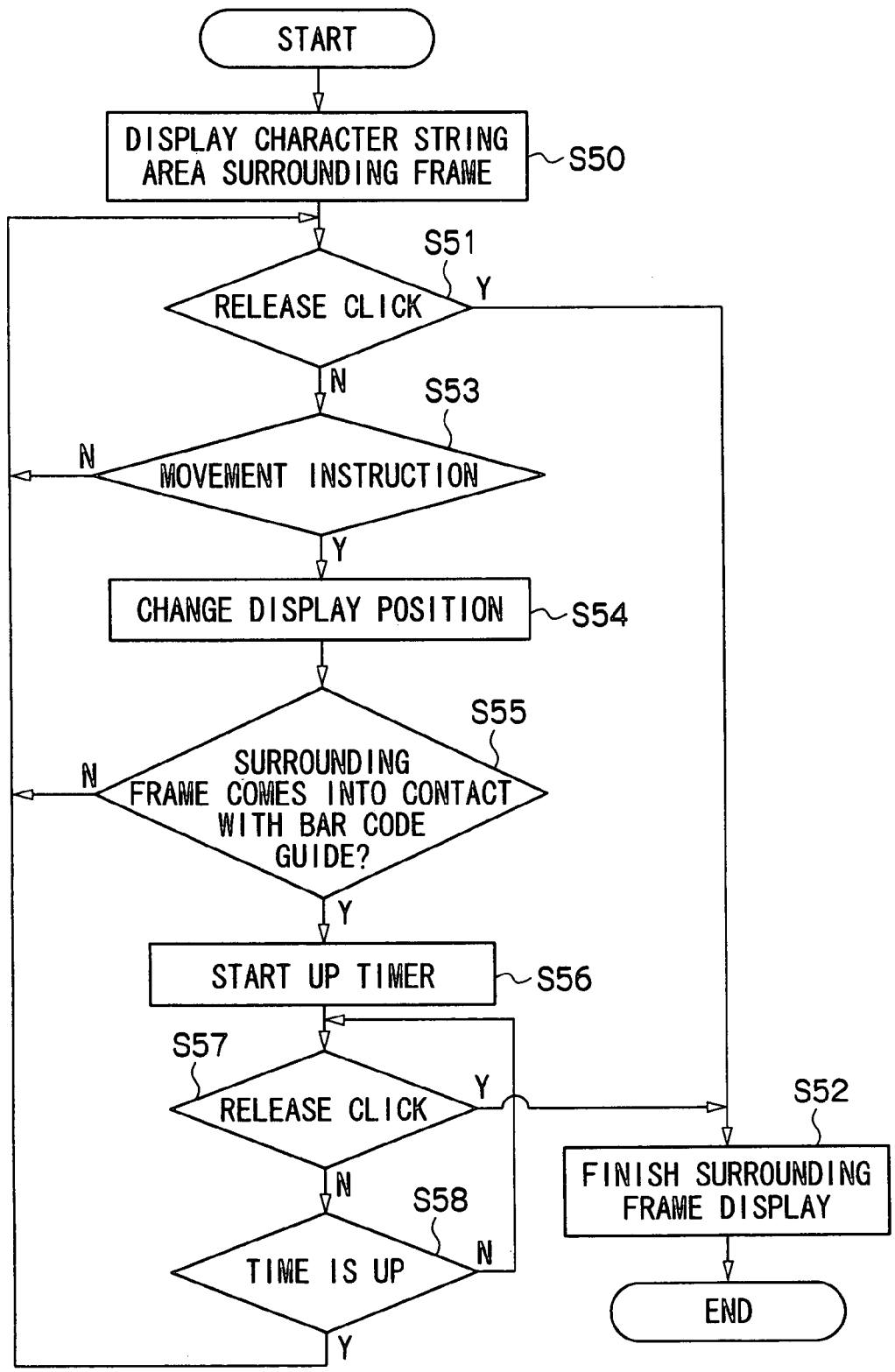
FIG. 10 is a flow chart showing a process when a character string area is moved in the first embodiment.

FIG. 10 is the flow chart showing a detailed operation example of the control unit 10 when the character string area is moved.

When the mouse unit 12 is clicked (for example, left click) while the cursor is located in the character string area, the control unit 10 starts the process shown in FIG. 10 to cause the display unit 13 to display the surrounding frame POS of the character string area (S50).

Then, the control unit 10 decides whether the click of the mouse unit 12 is released or not (S51). When the click of the mouse unit 12 is released, the control unit 10 causes the display unit 13 to finish the display of the surrounding frame POS of the character string area (S52) and to finish the movement processing of the character string area.

When the click of the mouse unit 12 is continued, the control unit 10 decides whether a movement signal is given from the mouse unit 12 or not (S53). When the movement signal is not given, the control unit 10 causes the process to return to the step S51.

When the movement signal is given, the control unit 10 updates the display positions of the character string (area) and the surrounding frame POS toward the direction of the movement instruction (S54). For example, the amount of update corresponds to each predetermined amount of micro unit or moving speed. Then, the control unit 10 decides whether the post-movement surrounding frame POS comes into contact with the bar code guide LIN or not (S55). When the post-movement surrounding frame POS does not come into contact with the bar code guide LIN even if the display positions of the character string (area) and the surrounding frame POS are moved, the control unit 10 causes the process to return to the step S51.

At this point, the word of "come into contact with" includes not only the case in which the surrounding frame POS of the character string area comes close to and comes into contact with the bar code guide LIN (the later-mentioned change from FIG. 11A to FIG. 11C), but also the case in which the surrounding frame POS comes into contact with the bar code guide LIN when the surrounding frame POS overlapped with the bar code guide LIN is moved away from the bar code guide LIN (the later-mentioned change from FIG. 11C to FIG. 11A). It is also possible that the word of "come into contact with" means only the former.

When the display positions of the character string (area) and the surrounding frame POS are moved to come into contact with the bar code guide LIN, the control unit 10 starts up a built-in timer (S56). At this point, a timing period is 0.5 or 1 second. It is possible that the timing period is fixed time or the timing period is set by the user. Before the time is up in the timer (S58), the control unit 10 decides whether the click of the mouse unit 12 is released or not (S57). When the click of the mouse unit 12 is released, the control unit 10 causes the display unit 13 to finish the display of the surrounding frame POS of the character string area (S52) and to finish the movement processing of the character string area.

When the time is up in the timer without releasing the click of the mouse unit 12, the control unit causes the process to return to the step S51.

Figure 11:
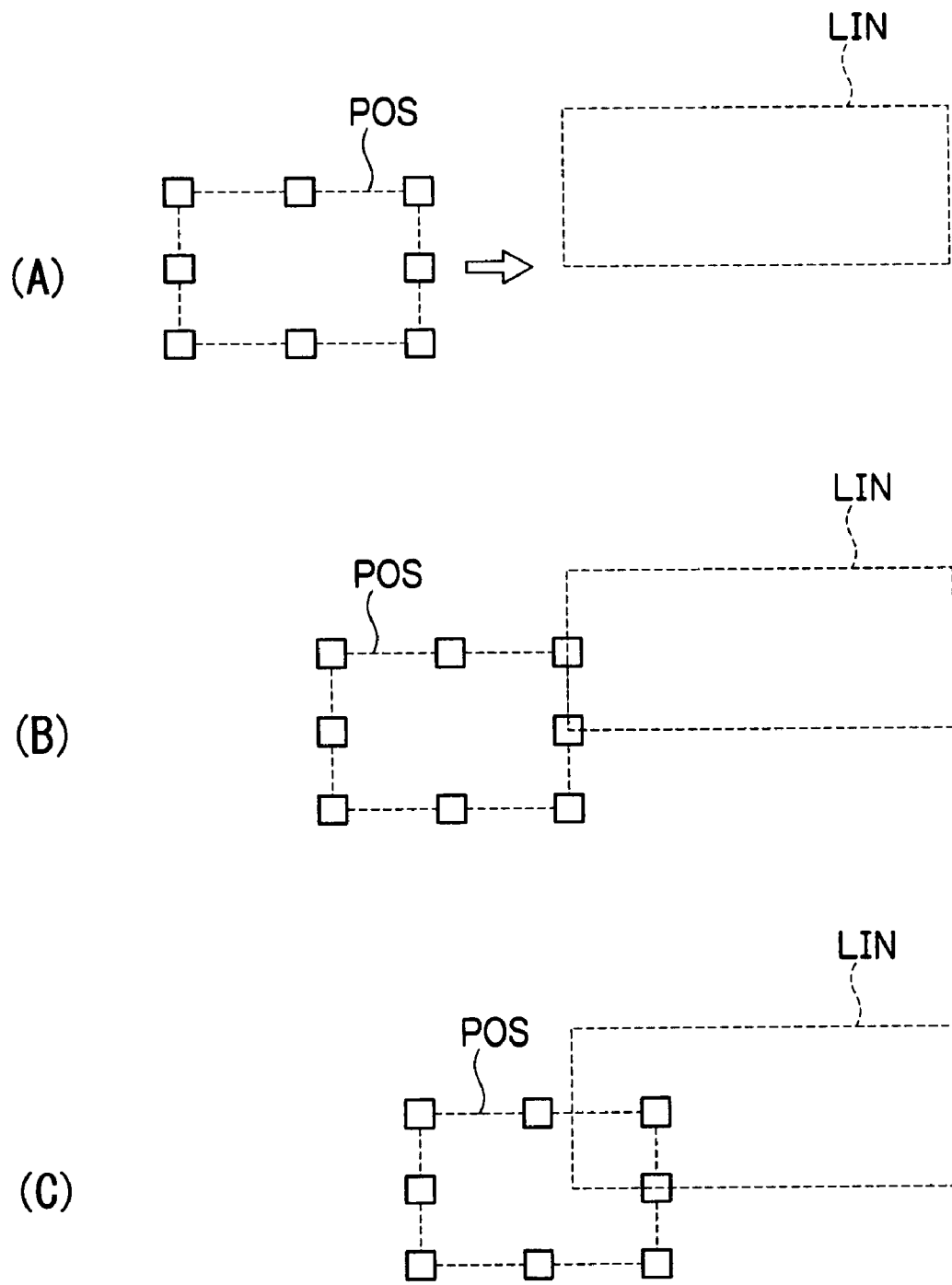
FIG. 11 is an explanatory view showing an example of a change in movement of the character string area of the first embodiment.

Referring to FIG. 11, the change in display in moving the character string area will be specifically described. Although the character string image is displayed in the surrounding frame POS of the character string area and the bar code image is displayed in the bar code guide LIN, the character string image and the bar code image are not shown in FIG. 11.

When the user moves the cursor into the character string area to click the mouse unit 12 in order to move the character string area, as shown in FIG. 11A, the surrounding frame POS is displayed. When the mouse unit 12 is moved while clicking, the surrounding frame POS (and character string) are gradually moved toward the direction in which the mouse unit 12 is moved.

As shown in FIG. 11B, when the surrounding frame POS of the character string area and the bar code guide LIN come into contact with each other by the movement processing, the display in which the surrounding frame POS of the character string area and the bar code guide LIN come into contact with each other as shown in FIG. 11B is continued until the time is up in the timer, even if the mouse unit 12 is moved.

When the click of the mouse unit 12 is released before the time is up in the timer, the movement processing is finished, and the positional relationship between the character string area and the bar code guide LIN is shown in FIG. 11B (the display of the surrounding frame POS is finished).

When the time is up in the timer while the movement processing of the mouse unit 12 is continued, the movement of the surrounding frame POS (and character string) is resumed and a part of the surrounding frame POS (and character string) is moved into the bar code guide LIN as shown in FIG. 11C. When the click of the mouse unit 12 is released, the movement processing is finished and the positional relationship between the character string area and the bar code guide LIN becomes the positional relationship at time when the click is released.

The surrounding frame POS of the character string area maintains the position shown in FIG. 11B for the timing period of the timer, when the user moves the surrounding frame POS from the position of the character string area shown in FIG. 11C to the position of the character string area shown in FIG. 11A.

When the printing is directed in the input image (see PIC1 and PIC2) whether the input image includes or does not include the bar code image, in accordance with the printer driver P2, the control unit 10 forms the print image data to transfer the print image data to the label printer 3, and the print image is printed. Unlike the print preview, the bar code guide LIN and the lines defining the print range BR are not included in the print image data.

According to the first embodiment, in the apparatus, the bar code guide is also displayed depending on the user's selection in the input print preview display while the margin is not included in the bar code image area, so that the user can freely and easily set a space which becomes the margin for the bar code image. Namely, the degree of user's flexibility is highly increased in specifying the margin of the bar code. Therefore, the print image including the bar code image desired by the user can be properly realized.

In the case where the label only including the bar code image is produced, it is also possible that the margin of the label (tape margin) is caused to exert the function of the quiet zone. In the case where the print image has the character string (except for bar code character string) image on the front end side of the label and the bar code image following the character string image, it is also possible that the bar code guide having the long left-side margin is displayed and the rear margin of the label functions as the quiet zone on the rear side (right side). Further, sometimes the margins in front of and at the back of the bar code image can be shorter than (the length of) the quiet zone depending on ability of the bar code reader. When the right and left margins of the bar code guide are shortened, the response to such cases can be easily made, and the amount of consumption of the expensive tape can be also suppressed.

Although the first embodiment shows the case where the bar code guide can be set whether it is displayed or not, the bar code guide may always be displayed.

The first embodiment shows no margin in the bar code image area. However, it is possible to use the apparatus which can set whether the margin is included in the bar code image area, or it is possible to separately provide the function of displaying the bar code guide.

The bar code guide with respect to the bar code image is displayed in the first embodiment. However, in displaying the bar code guide, it is possible to separately display the surrounding line (character string guide) defining the character string image area except for the bar code character string.

Although the first embodiment is directed to the one-dimensional bar code, the invention can be applied to a system which supports a two-dimensional code. In this case, the bar code guide having the margins not only in the lengthwise direction but also in the crosswise direction can be applied.

In the first embodiment, the right and left margins of the bar code guide were specified by the specific length (mm). However, it is possible that the right and left margins of the bar code guide are specified by the X-time width of the narrow line of the bar code, or it is possible that the right and left margins of the bar code guide are selected by the relative specification such as "Longer", "Normal" and "Shorter" on the basis of the length of the quiet zone and the control unit 10 sets the relative specification to an absolute value in consideration of the width of the narrow line of the bar code. When the narrow line width of the bar code is changed by utilizing a conversion table or a transformation, the displayed values (reference value) of the specific lengths of the right and left margins of the bar code guide are changed in the first embodiment. However, it is also possible that the change in narrow line width is not performed even if the specific lengths of the right and left margins of the bar code guide are changed. It is possible that the uppermost setting value and lowermost setting value of the right and left margins of the bar code guide are changed by the type of bar code.

It is possible that the lengths of the right and left margins of the bar code guide are not specified and the applied lengths are fixed.

It is possible that the display of the bar code guide is not permitted in the print image including only the bar code image and the presence or absence of the display of the bar code guide is permitted to be set only in the case where the bar code image and the character string image except for the bar code character string are mixed. In this case, it is possible to instruct the user to previously input the character string image except for the bar code character string by an instruction manual.

In the print image including only the bar code image, it is possible to change the initial display values of the right and left margins of the bar code guide in consideration of the margins of the label.

Figure 12:
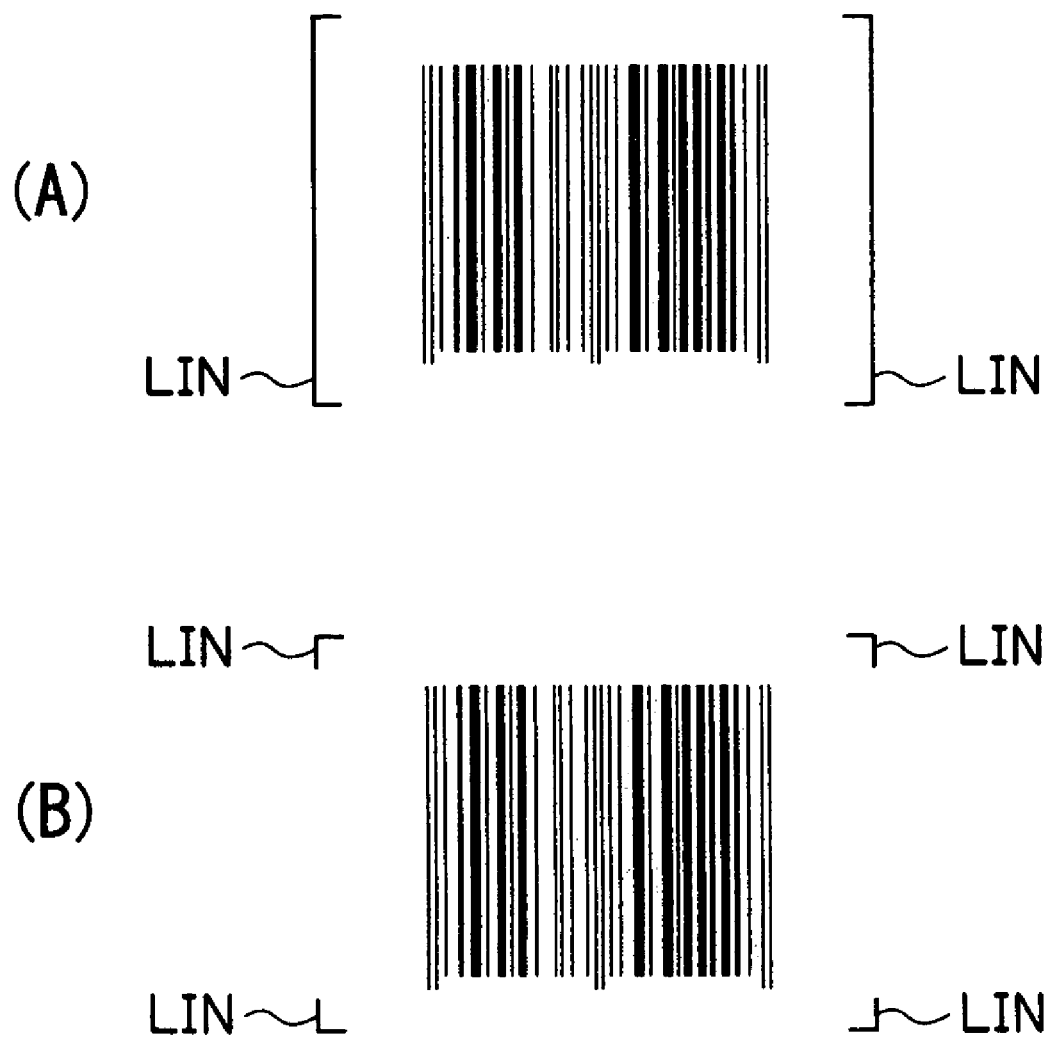
FIG. 12 is an explanatory view showing a display example of the bar code guide in a variation of the first embodiment.

In the first embodiment, the bar code guide is formed by the surrounding ruled line. However, as shown in FIGS. 12A and 12B, it is also possible to use the bar code guide which is not surrounded by the ruled line. In the case of the bar code guides having shapes shown in FIGS. 12A and 12B, it is possible that the display only on the right side or the display only on the left side is permitted.

In the first embodiment, the bar code guide is displayed only in the input print preview. However, it is also possible that the user can specify whether the bar code guide is printed or not. In the case where the printing has been performed, the label including only the bar code image area can be obtained by cutting out the print image along the bar code guide.

The bar code information input image (FIG. 6) including one image is shown in the first embodiment. However, it is also possible that the bar code information input image includes at least two images. In this case, the lower hierarchy image can include the presence or absence of the display of the bar code guide and the setting of the right and left margins of the bar code guide, and the default value can be easily applied as the presence or absence of the display of the bar code guide and the setting values of the right and left margins of the bar code guide.

In the first embodiment, the predetermined time display is held at the position where the character string area comes into contact with the bar code guide in moving the character string area. However, it is possible that the bar code guide is also displayed in moving the bar code image guide and the predetermined time display is held at the position where the character string area comes into contact with the bar code guide.

In sequential number operation in which a part of the numbers of the bar code is continuously printed, it is possible to display the bar code guide when the print preview is displayed by changing the print preview in accordance with the change in number.

(B) Second Embodiment

The second embodiment of the tape printing system, the tape printing method, and the tape printing program according to the invention will be described below.

The overall configuration of the tape printing system of the second embodiment can be also shown by the block diagram of FIG. 1 described in the first embodiment, the schematic configuration of the tape printing program of the second embodiment can be also shown by the explanatory view of FIG. 2, and the schematic flow of the process of producing the label in which the print image including the bar code image is printed can be also shown by the flow chart of FIG. 4.

The second embodiment has the feature in the detail of the process of inputting (FIG. 4, S3) the bar code information, which has been briefly described in the first embodiment. The feature will be mainly described below. It is also possible that the following method is applied to the process of inputting the bar code information in the first embodiment.

Figure 13:
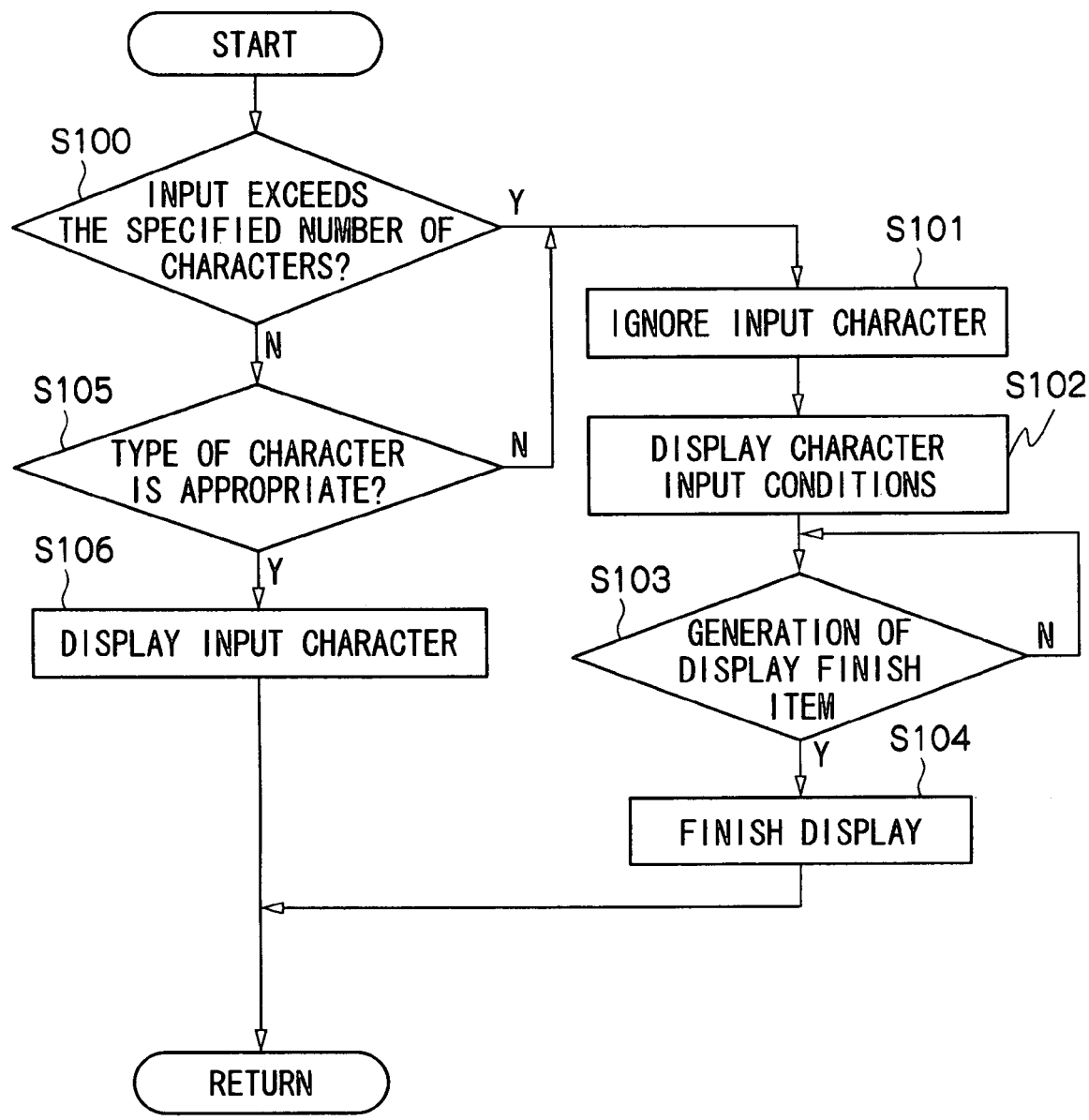
FIG. 13 is a flow chart showing the process in inputting characters with respect to the bar code of a second embodiment.

FIG. 13 is the flow chart showing the process when a certain character (code) is input into the code string input field WIN2*b*.

When some characters are input to the input field WIN2*b*, the control unit 10 decides whether the number of currently input characters exceeds the number of characters determined by the selected type of bar code or not (S100). For example, the character string input having 12-figure numbers is provided in "JAN-13" and the character string input having seven-figure numbers is provided in "JAN-8." When the thirteenth figure number is input while "JAN-13" is selected, the input exceeds the provided number of characters.

Figure 14:
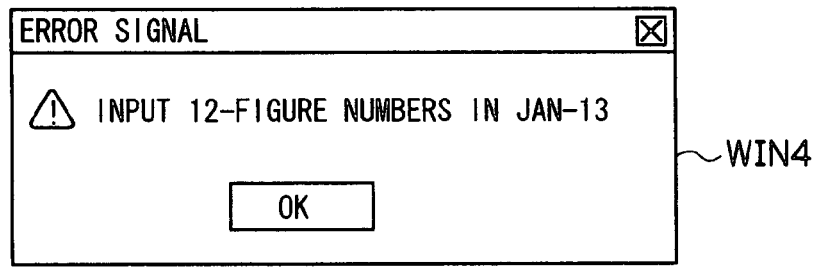
FIG. 14 is an explanatory view showing a warning image when an input does not satisfy character input conditions of the second embodiment.

When the number of currently input characters exceeds the number of characters determined by the selected type of bar code (bar code standard), the control unit 10 ignores the currently input characters (S101; the character string which has been previously input is still valid) to display a window WIN4 for acknowledging the character input conditions in the selected type of bar code (S102; for example, the control unit 10 prompts the user to input the 12-figure numbers in JAN-13) as shown in FIG. 14. When a display finishing item is generated (S103), the display of the window WIN4 is finished (S104) to return to the main routine. The display finishing item means that the "OK" icon is operated in the window WIN4 or the display time exceeds the predetermined time. Instead of the display of the window WIN4, it is possible to generate a sound for expressing the ignorance of the currently input characters.

When the currently input character satisfies the character input conditions with respect to the number of characters, the control unit 10 decides whether the type of currently input character corresponds to the type of character determined by the selected type of bar code or not (S105). For example, only numeric characters can be input in "JAN-13", and numeric characters, alphabetic characters, and symbols (in addition, start and stop codes are also determined, it is also possible that the apparatus automatically adds the start and stop codes) can be input in "Code39." When the alphabetic character is input while "JAN-13" is selected, the input is performed by the type of character other than the provided type of character.

When the type of currently input character differs from the type of character determined by the selected type of bar code, the control unit 10 transfers the flow to the step S101 to perform the processing such as the ignorance of the currently input character.

When the type of currently input character corresponds to the type of character determined by the selected type of bar code, the control unit 10 additionally displays the currently input character in the code string input field WIN2*b* (S106) to return to the main routine.

Thus, in the second embodiment, the confirmation of the character input conditions determined by the type of bar code is performed in each input of the character, and the character input which does not satisfy the character input conditions is ignored.

Figure 15:
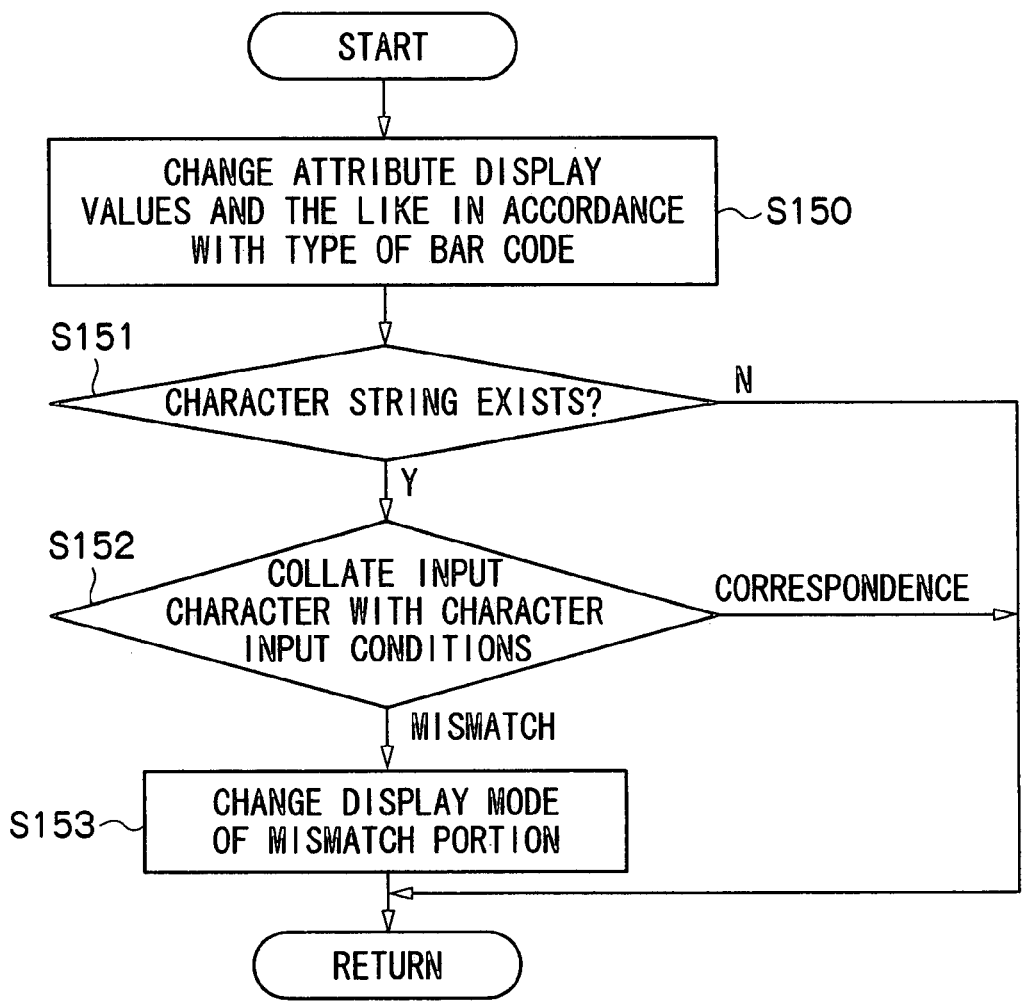
FIG. 15 is a flow chart showing the process when a type of bar code of the second embodiment is changed.

FIG. 15 is the flow chart showing the process when the change operation of the type of bar code is performed. The change operation of the type of bar code is performed as the first operation immediately after the bar code input window imageWIN2 is displayed, and the change operation of the type of bar code is also performed in such a manner that the user notices a setting mistake of the type of bar code by seeing the display of the window WIN4 for acknowledging the character input conditions because the input does not satisfy the character input conditions in inputting the character code.

When the type of bar code is changed, the control unit 10 properly changes the displays such as various input fields (in this case, except for the code string (character string) input field WIN2*b*) and the checkboxes in accordance with the changed type of bar code (S150). For example, the contents of the character string font input field WIN2*e* and character size input field WIN2*f* are changed to the default values in the changed type of bar code, or the checkbox WIN2*g* with respect to the check digit is changed to the valid state or invalid state in accordance with provision of the check digit in the changed type of bar code.

Then, at the time when the change instruction is provided, the control unit 10 decides whether the character string is input to the code string (character string) input field WIN2*b* or not (S151). When the character string is not input to the input field WIN2*b*, the control unit 10 causes the flow to return to the main routine.

When the character string is input to the input field WIN2*b*, the control unit 10 collates the character string with the character input conditions in the changed type of bar code (S152). When a mismatch part exists in the collation, the display is performed in the mode clearly showing the mismatch (S153) to return to the main routine. For example, the character string part exceeding the provided number of characters is displayed in a first color different from the color used for the characters corresponding to the provided number of characters. The character, which is located in the character string part not more than the provided number of characters and has the type of character different from the character input conditions, is displayed in a second color different from the color used for the characters corresponding to the provided number of characters. In the case where the mismatch part exists, it is also possible that the character input conditions of the changed type of bar code are acknowledged by utilizing the window WIN4 (FIG. 14).

At this point, the character string of the input field WIN2*b* can be deleted in a collective manner by a clear direction key included in the keyboard unit 11, and the character string of the input field WIN2*b* can be deleted in one character unit by a deletion direction key included in the keyboard unit 11.

As described above, in the second embodiment, the bar code information can be input in the procedure, in which the character string is input while the type of bar code is in the default state and then the type of bar code is selected. A part or the whole of the input character string can be utilized even if the type of bar code is changed. On the contrary, in the conventional apparatus, when the type of bar code is changed, even if the character string is input, the character string is automatically deleted.

When the bar code information is input and the "OK" icon WIN2*l* is clicked in the bar code input window image WIN2, the control unit 10 confirms whether the input contents are appropriate or not (S4 of FIG. 4). The subsequent processes are as described in the first embodiment.

According to the second embodiment, in each input of the character expressed by the bar code, the input character is collated with the character input conditions in the selected type of bar code to acknowledge the mismatch in the case of the mismatch. Therefore, the user can immediately recognize the input mistake. The input mistake includes not only the case of the mistake of the type of character but also the case in which the character input is correct but the setting of the type of bar code is failed.

According to the second embodiment, the type of bar code can be changed after the character expressed by the bar code is input, and the flexibility of the input procedure can be improved. Therefore, in accordance with the acknowledgement of the mismatch after the character input, the response to the mismatch can be performed by the change in the type of the bar code. Further, the input character is collated with the character input conditions in the post-change type of bar code to display the mismatch part of the input character in the mode different from the coincident part. Therefore, a part or the whole of the input character string can be directly properly utilized.

For example, in the case where the user inputs the seven-figure numbers in the selection state of "JAN-13" while intending to input the seven-figure numbers in the selection state of "JAN-8" and then the user notices the mistake to change the type of bar code to "JAN-8," the character string which has been already input can be directly utilized. On the contrary, in the case where the user inputs the numeric characters in the selection state of "JAN-8" while intending to input the numeric characters in the selection state of "JAN-13," when the user inputs the eighth figure number, the window WIN4 (see FIG. 14) for acknowledging the character input conditions in "JAN-8", is displayed. Even if the user notices the mistake of setting the type of bar code by the display to change the type of bar code to "JAN-13," the already input seven-figure numbers can be directly utilized.

(C) Third Embodiment

A third embodiment of the tape printing system, the tape printing method, and the tape printing program according to the invention will be described below.

A hardware configuration of the tape printing system of the third embodiment can be also shown by FIG. 1 of the first embodiment. The tape printing program realizing the tape printing method of the third embodiment also includes the label producing editor portion and the printer driver portion, and the label producing editor portion has the bar code input routine.

Figure 16:
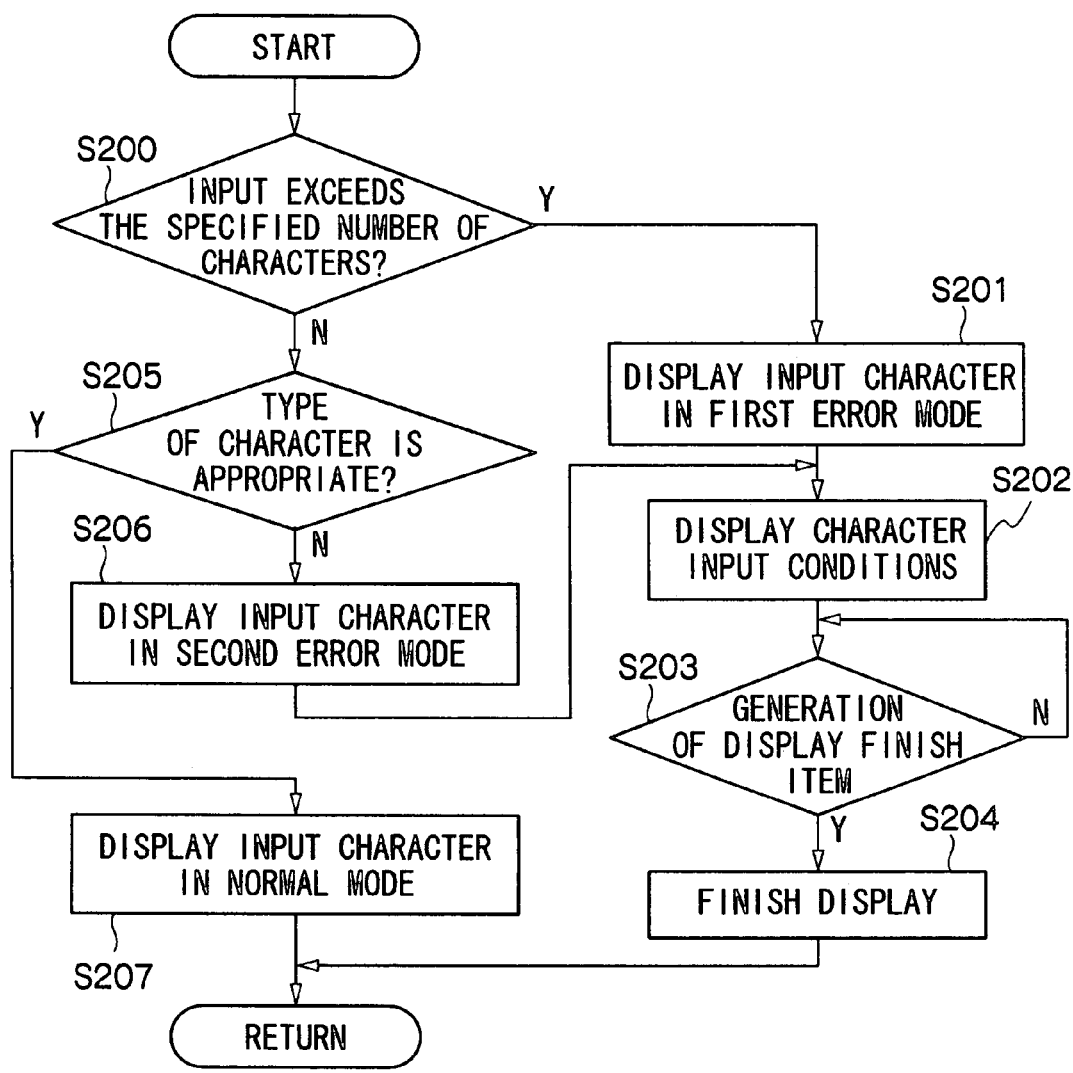
FIG. 16 is a flowchart showing the process in inputting the characters with respect to the bar code of a third embodiment.

The third embodiment differs from the second embodiment in the input processing of the character string expressed by the bar code in the bar code input routine. FIG. 16 is the flow chart showing the process of the third embodiment when a certain character (code) is input to the code string input field WIN2b (see FIG. 6), and FIG. 16 corresponds to FIG. 13 of the second embodiment.

When a certain character is input to the input field WIN2b, the control unit 10 decides whether the number of currently input characters exceeds the number of characters determined by the selected type of bar code (bar code standard) or not (S200).

When the number of currently input characters exceeds the number of characters determined by the selected type of bar code, the control unit 10 additionally displays the currently input characters in the code string input field WIN2b in the display mode which indicates that the input exceeds the number of characters (S201). Then, the window WIN4 for acknowledging the character input conditions in the selected type of bar code is displayed in FIG. 14 (S202). When the display finishing item is generated (S203), the display of the window WIN4 is finished (S204) to return to the main routine.

When the input character satisfies the character input conditions with respect to the number of characters, the control unit 10 decides whether the type of currently input character corresponds to the type of character determined by the selected type of bar code or not (S205).

When the type of currently input character differs from the type of character determined by the selected type of bar code, the control unit 10 additionally displays the currently input characters in the code string input field WIN2b in the display mode which indicates that the type of currently input character differs from the type of character determined by the selected type of bar code (S206), and then the control unit 10 transfers the flow to the step S202.

When the type of currently input character corresponds to the type of character determined by the selected type of bar code, the control unit 10 additionally displays the currently input character in the code string input field WIN2b in the normal display mode (S207) to return to the main routine.

Thus, in the third embodiment, the confirmation of the character input conditions determined by the type of bar code is performed in each input of the character, and the input character not satisfying the character input conditions is temporarily received. This corresponds to the case in which the type of bar code may be changed after the character is input.

Figure 17:
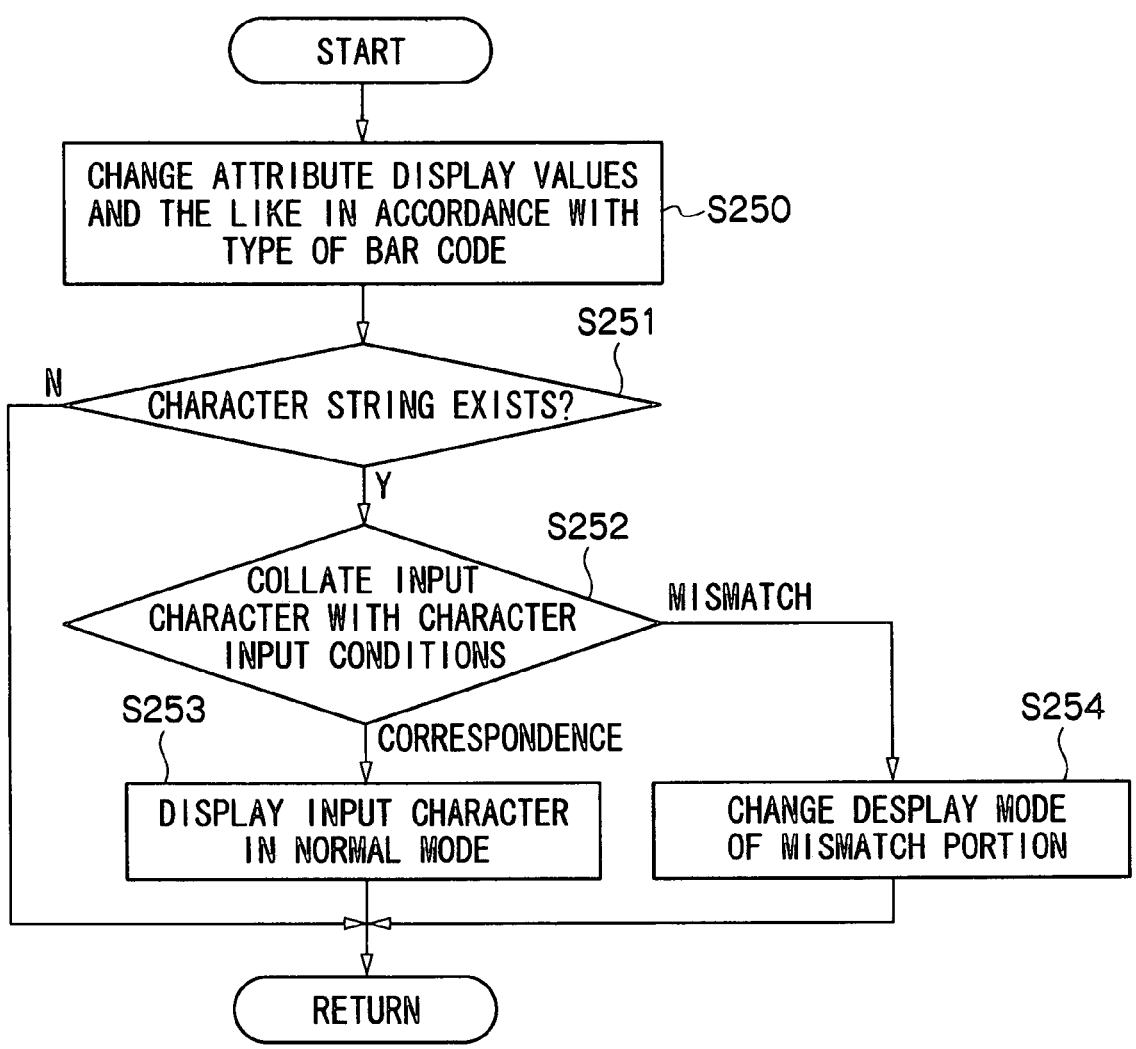
FIG. 17 is a flow chart showing the process when the type of bar code of the third embodiment is changed.

The third embodiment also permits the change in the type of bar code after the input processing of the character string expressed by the bar code. FIG. 17 is the flow chart showing the process of the third embodiment when the change operation of the type of bar code is performed and FIG. 17 corresponds to FIG. 15 of the second embodiment.

When the type of bar code is changed, the control unit 10 properly changes the displays such as various input fields (in this case, except for the code string (character string) input field WIN2b) and the checkboxes in accordance with the changed type of bar code (S250). Then, at the time when the change instruction is provided, the control unit 10 decides whether the character string is input to the code string (character string) input field WIN2b or not (S251). When the character string is not input to the input field WIN2b, the control unit 10 causes the flow to return to the main routine.

When the character string is input to the input field WIN2b, the control unit 10 collates the character string with the character input conditions in the changed type of bar code (S252).

When the mismatch part does not exist in the collation, the control unit 10 displays the character string in the normal display mode (S253). When the mismatch part exists, the display is performed in the mode clearly showing the mismatch (for example, the mode is changed depending on the exceeded number of characters and the character type mismatch) (S254). Subsequently, the control unit causes the flow to return to the main routine.

The third embodiment can exert the same effect as the second embodiment. According to the third embodiment, in the case where the error display of the character input expressed by the bar code is caused by the mistake of setting the type of bar code, the input is received even if the input character does not satisfy the character input conditions in the type of bar code in which the mistake of the setting is generated, so that the third embodiment has an advantage that the input character which has already been input is also utilized in changing the type of bar code.

The following modifications can be cited as common modifications between the second and third embodiments.

Although the bar code information input image (FIG. 6) including one image is shown in the second and third embodiments, it is also possible that the bar code information input image is formed by at least two images and the input is performed by changing the images in accordance with the user's operation. In this case, it is possible to provide the item, in which the user sets whether the character string expressed by the already input bar code is succeeded or not in changing the type of bar code, as the image item of the lower hierarchy. This modification can be also applied to the second and third embodiments formed by one image.

The character string which succeeds the character string expressed by the already input bar code independently of the relationship between the types of bar codes before and after the change in changing the type of bar code is shown in the second and third embodiments. However, the character string which succeeds the character string expressed by the already input bar code and the relationship between the types of bar codes before and after the change are defined, and it is possible to automatically delete the character string expressed by the already input bar code when the type of bar code not satisfying the relationship is changed. For example, the succession of the character string expressed by the already input bar code can be permitted between "JAN-13" and "JAN-8" in which the type of character is common and the number of characters is different, and the succession of the character string expressed by the already input bar code can not be permitted between "JAN-13" and "Code39" in which the both type of character and the number of characters are different.

Whether the input character corresponds to the character input conditions or not in each input of the character expressed by the bar code is decided in the second and third embodiments. However, it is also possible to increase a decision period such that the input characters are decided in each two-character input, or it is also possible that the decision period is arbitrarily set. It is also possible that the type of character is not decided when the numeric character is input and the type of character is decided when the alphabetic character or the symbol is input. Further, it is possible that the decision whether the character expressed by the bar code corresponds to the character input conditions or not in each input of the character is set to the setting item.

As described in the second and third embodiments, the technical idea that the character string input before the change is utilized independently of the change in the type of bar code can be also applied to the case in which the input character is not collated with the character input conditions in each input of the character but the input characters are collated with the character input conditions in the key operation indicating the end of the character string input.

In the second and third embodiments, the application is directed to the one-dimensional bar code. However, the technical idea of the second and third embodiments can be also applied to the system which supports the two-dimensional code.

(D) Another Embodiment

The tape printing system 1 including the information processing apparatus 2 such as the personal computer and the label printer 3 serving as the peripheral device of the information processing apparatus 2 is shown in each of the above-described embodiments. Needless to say, the invention can be also applied to the tape printing system which is of a special purpose machine (tape printing apparatus).

What is claimed is:

1. A tape printing system which forms a label by capturing a print image to print the print image in a tape, the system comprising:
    bar code information inputting means for capturing a character string for a bar code image to be included in the print image;
    bar code image forming means for converting the character string captured by the bar code information inputting means into the bar code image;
    print preview displaying means for displaying a print preview of the print image; and
    display controlling means for displaying a bar code guide which defines a bar code image target area containing the bar code image and top, bottom, right and left margins surrounding the bar code image, the bar code guide being included in the print preview when the print image including the bar code image is displayed by the print preview.

2. A tape printing system according to claim 1, wherein the bar code image forming means forms the bar code image obtained by converting the bar code information so that no margin exists.

3. A tape printing system according to claim 1, further comprising;
    bar code type setting means for setting a type of bar code, and
    type change collating means for deciding whether or not the bar code information inputting means has already captured the character string when the type of bar code is changed to a new bar code type by the bar code type setting means, and for collating the character string which has been already captured with character input conditions of the new bar code type when the bar code information inputting means has already captured the character string.

4. A tape printing system according to claim 1, further comprising:
    margin setting means for changing the right and left margins.

5. A tape printing system according to claim 4 further comprising:
    causing relative movement between the bar code image and the bar code guide in the print preview display.

6. A tape printing system according to claim 1 further comprising:
    causing relative movement between the bar code image relative to the bar code guide in the print preview display.

7. A tape printing method according to claim 1 further comprising:
    causing relative movement between the bar code image and the bar code guide in the print preview display.

8. A tape printing method which forms a label by capturing a print image and printing the print image on a tape, the method comprising:
    inputting bar code information by capturing a character string for a bar code image to be included in the print image;
    converting the character string captured by the bar code information inputting step into the bar code image;
    displaying a print preview of the print image; and
    displaying a bar code guide which defines a bar code image target area including the bar code image and top, bottom, right and left margins surrounding the bar code image, the bar code guide being included in the print preview when the print image including the bar code image is displayed by the print preview.

9. A tape printing method according to claim 8, wherein the bar code image obtained by converting the bar code information is formed so as to have no margin in the bar code image forming step.

10. A tape printing method according to claim 8, further comprising;
    a bar code type setting step for setting a type of bar code, and
    a type change collating step for deciding whether the bar code information inputting step has already captured the character string or not when the type of bar code is changed by the bar code type setting step, and for collating the character string which has been already captured with character input conditions of the post-change type of bar code when the bar code information inputting step has already captured the character string.

11. A tape printing method according to claim 8, further comprising;
    changing the right and left margins.

12. A tape printing method according to claim 11 further comprising:
    causing relative movement between the bar code image and the bar code guide in the print preview display.

13. A tape printing system which forms a label by capturing a print image and printing the captured print image on a tape, the system comprising:
    bar code type setting means for setting a type of bar code;
    bar code information inputting means for capturing a character string for a bar code image to be included in the print image;
    bar code image forming means for converting the character string captured by the bar code information inputting means into the bar code image; and
    type change collating means for deciding whether or not the bar code information inputting means has already captured the character string when the type of bar code is changed to a new bar code type by the bar code type setting means, and for collating the character string which has been already captured with character input conditions of the new bar code type when the bar code information inputting means has already captured the character string.

14. A tape printing system according to claim 13, wherein the bar code information inputting means collates the input character with character input conditions with respect to the type of bar code set by the bar code type setting means when the character is input.

15. A tape printing system according to claim 13, wherein the character input conditions are the specified number of characters and the permitted type of character.

16. A tape printing method which forms a label by capturing a print image and printing the captured print image on a tape, the tape printing method comprising:
setting a type of bar code;
inputting bar code information by capturing a character string for a bar code image to be included in the print image;
converting the captured character string into the bar code image; and
deciding whether or not the bar code information inputting has already captured the character string when the type of bar code is changed to a new bar code type by the setting of the bar code type, and
collating the character string which has been already captured with character input conditions for the new bar code type when the bar code information inputting has already captured the character string.

17. A tape printing method according to claim 16, wherein the bar code information inputting step collates the input character with character input conditions with respect to the type of bar code set by the bar code type setting step when the character is input.

18. A tape printing method according to claim 16, wherein the character input conditions are the specified number of characters and the permitted type of character.

* * * * *

UNITED STATES PATENT AND TRADEMARK OFFICE
CERTIFICATE OF CORRECTION

PATENT NO. : 7,264,164 B2  Page 1 of 1
APPLICATION NO. : 10/917539
DATED : September 4, 2007
INVENTOR(S) : Mamoru Sakai et al.

It is certified that error appears in the above-identified patent and that said Letters Patent is hereby corrected as shown below:

Column 19, line 61 (claim 5, line 3), "causing" should read -- means for causing --.
Column 19, line 65 (claim 6, line 3), "causing" should read -- means for causing --.
Column 20, line 1  (claim 7, line 1), "method" should read -- system --.
Column 20, line 3  (claim 7, line 3), "causing" should read -- means for causing --.

Signed and Sealed this

Twenty-ninth Day of April, 2008

JON W. DUDAS
*Director of the United States Patent and Trademark Office*